United States Patent
Hirao et al.

(10) Patent No.: US 9,074,033 B2
(45) Date of Patent: Jul. 7, 2015

(54) ETHYLENE/TETRAFLUOROETHYLENE COPOLYMER, ELECTRICAL WIRE, AND FLUORINE RESIN POWDER FOR ROTATIONAL MOLDING

(75) Inventors: Takayuki Hirao, Settsu (JP); Kenji Ichikawa, Settsu (JP); Shigehito Sagisaka, Settsu (JP); Yumi Nakano, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 346 days.

(21) Appl. No.: 13/265,395

(22) PCT Filed: Apr. 20, 2010

(86) PCT No.: PCT/JP2010/057009
§ 371 (c)(1),
(2), (4) Date: Oct. 20, 2011

(87) PCT Pub. No.: WO2010/123002
PCT Pub. Date: Oct. 28, 2010

(65) Prior Publication Data
US 2012/0037398 A1     Feb. 16, 2012

(30) Foreign Application Priority Data

Apr. 21, 2009 (JP) .................. 2009-103351

(51) Int. Cl.
*D02G 3/00* (2006.01)
*H01B 3/44* (2006.01)
*C08F 214/26* (2006.01)
*H01B 7/29* (2006.01)

(52) U.S. Cl.
CPC ........ *C08F 214/265* (2013.01); *Y10T 428/2982* (2015.01); *H01B 3/445* (2013.01); *H01B 7/292* (2013.01)

(58) Field of Classification Search
CPC ...................... C08F 214/265; Y10T 428/2982
See application file for complete search history.

(56) References Cited

U.S. PATENT DOCUMENTS

| 3,624,250 | A | * | 11/1971 | Carlson | ........................ 526/247 |
| 4,521,575 | A | | 6/1985 | Nakagawa et al. | |
| 4,614,276 | A | | 9/1986 | Ihara et al. | |
| 6,589,597 | B1 | | 7/2003 | Ono et al. | |
| 2003/0175513 | A1 | * | 9/2003 | Tokarsky et al. | ............. 428/364 |

FOREIGN PATENT DOCUMENTS

| EP | 0673952 A1 * | 9/1995 |
| EP | 1 842 863 A1 | 10/2007 |
| JP | 47-23671 | 7/1972 |
| JP | 54-33583 A | 3/1979 |
| JP | 54-132692 A | 10/1979 |
| JP | 59-147006 A | 8/1984 |
| JP | 60-248710 A | 12/1985 |
| JP | 6-80728 A | 3/1994 |
| JP | 7-41522 A | 2/1995 |
| JP | 11-269274 A | 10/1999 |

* cited by examiner

*Primary Examiner* — Jill Gray
(74) *Attorney, Agent, or Firm* — Sughrue Mion, PLLC

(57) ABSTRACT

The present invention provides an ethylene/tetrafluoroethylene copolymer showing good heat resistance and good crack resistance even in a high temperature environment. The present invention is an ethylene/tetrafluoroethylene copolymer, comprising: copolymerization units derived from ethylene; tetrafluoroethylene; and a fluorine-containing vinyl monomer represented by general formula: $CH_2=CH-Rf$ in the formula, Rf representing a perfluoroalkyl group containing four or more carbon atoms, a fluorine-containing vinyl monomer content being 0.8 to 2.5 mol % to a total amount of all monomers, an ethylene/tetrafluoroethylene molar ratio being 33.0/67.0 to 44.0/56.0, a CH index being 1.40 or less, a melting point being 230° C. or higher, and a melt flow rate being 40 (g/10 minutes) or less.

8 Claims, No Drawings

ETHYLENE/TETRAFLUOROETHYLENE COPOLYMER, ELECTRICAL WIRE, AND FLUORINE RESIN POWDER FOR ROTATIONAL MOLDING

CROSS REFERENCE TO RELATED APPLICATIONS

This application is a National Stage of International Application No. PCT/JP2010/057009 filed on Apr. 20, 2010, which claims priority from Japanese Patent Application No. 2009-103351, filed on Apr. 21, 2009, the contents of all of which are incorporated herein by reference in their entirety.

TECHNICAL FIELD

The present invention relates to an ethylene/tetrafluoroethylene copolymer, an electrical wire, and a fluororesin powder for rotational molding.

BACKGROUND ART

Copolymers of ethylene with tetrafluoroethylene [ETFEs] have well balanced thermal, chemical, mechanical, and electrical properties. Therefore, ETFEs are used in the field where heat resistance and chemical resistance are needed, specifically used for electrical wire covering, tubes, hoses, sheets, and the like.

However, ETFEs problematically tend to crack. In order to solve such a problem, methods for suppressing the generation of cracks by introducing a small amount of third monomer into copolymers have been examined.

Patent Document 1 discloses an ethylene/tetrafluoroethylene copolymer produced by polymerizing a supplemental amount of copolymerizable vinyl monomer which has no telogen activity and provides into the copolymer a side chain containing two or more carbon atoms.

Example IX discloses the embodiment in which $CF_2=CF-O_5F_{11}$, $CF_2=CF-C_2F_5$, or the like is polymerized as a vinyl monomer.

Patent Documents 2 and 3 each disclose in Example 2 a copolymer having a molar ratio of tetrafluoroethylene/ethylene/perfluorohexylethylene of 53/46.3/0.7. Patent Document 2 discloses in Example 4 a copolymer having a molar ratio of tetrafluoroethylene/ethylene/perfluorobutylethylene of 53/45.5/1.5.

Patent Document 4 discloses an ethylene/tetrafluoroethylene copolymer having a molar ratio of tetrafluoroethylene/ethylene of 50-60/50-40, including a fluorine-containing vinyl monomer copolymerizable with ethylene and tetrafluoroethylene, and having a volumetric flow rate of 10 to 300 mm$^3$/sec. The fluorine-containing vinyl monomer mentioned above is particularly preferably $CH_2=CH-C_4F_9$, and the amount of the fluorine-containing vinyl monomer is particularly preferably 2.5 to 5.0 mol %.

Patent Document 1: JP 47-23671 B
Patent Document 2: JP 54-033583 A
Patent Document 3: JP 54-132692 A
Patent Document 4: JP 7-041522 A

SUMMARY OF THE INVENTION

Problems to be Solved by the Invention

However, the introduction of a third monomer caused decrease in heat resistance, which did not allow improvement in crack resistance with maintenance of the heat resistance under conventional technologies.

An object of the present invention is to provide copolymers showing good heat resistance and further showing good crack resistance even in a high temperature environment, compared to conventional copolymers.

Means for Solving the Problems

As a result of intensive investigations by the present inventors in an attempt to solve the above problems, it has been found that a monomer having a relatively long side chain may be used as a specific third monomer to properly control a composition and melt flow rate of each monomer in addition to a CH index, which leads to an improvement in the crack resistance of an ethylene/tetrafluoroethylene copolymer with maintenance of the heat resistance thereof. As a result, the present invention has been completed.

The present invention is an ethylene/tetrafluoroethylene copolymer, comprising: copolymerization units derived from ethylene; tetrafluoroethylene; and a fluorine-containing vinyl monomer represented by general formula: $CH_2=CH-Rf$, in the formula, Rf representing a perfluoroalkyl group containing four or more carbon atoms, a fluorine-containing vinyl monomer content being 0.8 to 2.5 mol % to a total amount of all monomers, an ethylene/tetrafluoroethylene molar ratio being 33.0/67.0 to 44.0/56.0, a CH index being 1.40 or less, a melting point being 230° C. or higher, and a melt flow rate being 40 (g/10 minutes) or less.

The present invention is further an electrical wire, comprising at least: a central conductor; and a covering layer formed at a periphery of the central conductor, the covering layer being made of a forming material including the ethylene/tetrafluoroethylene copolymer.

The present invention is further a fluororesin powder for rotational molding, comprising the ethylene/tetrafluoroethylene copolymer,
wherein the fluororesin powder for rotational molding has a MFR of 15 to 35 (g/10 minutes) and an average particle size of 10 to 500 µm.

Effect of the Invention

The ethylene/tetrafluoroethylene copolymer of the present invention has good heat resistance, and has good crack resistance even in a high temperature environment. The ethylene/tetrafluoroethylene copolymer of the present invention is useful as a forming material, particularly, as a material for covering a portion of an electrical wire to which bending stress is repeatedly applied.

Modes for Carrying out the Invention

The ethylene/tetrafluoroethylene copolymer [ETFE] of the present invention includes copolymerization units derived from ethylene, tetrafluoroethylene, and a fluorine-containing vinyl monomer represented by general formula:

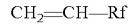

in the formula, Rf representing a perfluoroalkyl group containing four or more carbon atoms.

Rf mentioned above is preferably a perfluoroalkyl group containing six or more carbon atoms, and preferably a perfluoroalkyl group containing seven or less carbon atoms.

The fluorine-containing vinyl monomer is preferably at least one monomer selected from the group consisting of $CH_2=CH-C_4F_9$, $CH_2=CH-C_5F_{11}$, $CH_2=CH-C_6F_{13}$, $CH_2=CH-C_7F_{15}$, and $CH_2=CH-C_8F_{17}$; more preferably at least one monomer selected from the group consisting of $CH_2=CH-C_6F_{13}$, $CH_2=CH-C_7F_{15}$, and $CH_2=CH-C_8F_{17}$; and still more preferably $CH_2=CH-C_6F_{13}$.

The fluorine-containing vinyl monomer content of the ethylene/tetrafluoroethylene copolymer of the present invention is 0.8 to 2.5 mol %, more preferably 0.8 to 2.4 mol %, still more preferably 0.8 to 1.8 mol %, particularly preferably 0.9 to 1.8 mol %, and most preferably 1.2 to 1.8 mol %, to a total amount of all monomers. When the fluorine-containing vinyl monomer content is within the range mentioned above, the ethylene/tetrafluoroethylene copolymer has good heat resistance, and has good crack resistance even in a high temperature environment.

The ethylene/tetrafluoroethylene molar ratio of the ethylene/tetrafluoroethylene copolymer of the present invention is 33.0/67.0 to 44.0/56.0, and more preferably 34.5/65.5 to 44.0/56.0. When the ethylene/tetrafluoroethylene molar ratio is within the range mentioned above, the ethylene/tetrafluoroethylene copolymer has good heat resistance. The ethylene/tetrafluoroethylene molar ratio may be 34.5/65.5 to 43.5/56.5, and may be 34.5/65.5 to 43.0/57.0.

The amount of each monomer included in the ethylene/tetrafluoroethylene copolymer of the present invention can be determined by melting $^{19}F$—NMR.

The CH index of the ethylene/tetrafluoroethylene copolymer of the present invention is 1.40 or smaller, and more preferably 1.30 or smaller. A too large CH index impairs crack resistance after heat aging. The lower limit of the CH index may be, but not particularly limited to, 0.80 or greater, and may be 1.00 or greater, for example.

The CH index is a value calculated by the following formula based on a chart obtained from the measurement of the copolymer by $^1H$—NMR.

CH index=$E/F$×[ethylene content]

E=integral value of the range of a valley between peaks, which is observed around from 1.75 ppm to 1.96 ppm
F=integral value of the range from 1.75 to 4.5 ppm The melt flow rate [MFR] of the ethylene/tetrafluoroethylene copolymer of the present invention is 40 or lower (g/10 minutes). Too large MFR causes insufficient mechanical strength. The MFR is preferably 35 or lower (g/10 minutes), and the lower limit thereof may be, but not particularly limited to, 1 (g/10 minutes).

The MFR can be measured by a melt indexer.

The melting point of the ethylene/tetrafluoroethylene copolymer of the present invention is preferably 230° C. or higher. A too low melting point causes deformation of the copolymer at high temperature, which impairs the heat resistance. The melting point is more preferably higher than 230° C., still more preferably 240° C. or higher. The upper limit of the melting point may be, but not particularly limited to, 300° C.

The melting point can be measured by a differential scanning calorimeter.

The ethylene/tetrafluoroethylene copolymer of the present invention may include a copolymerization unit derived from monomers other than ethylene, tetrafluoroethylene, and a fluorine-containing vinyl monomer while not prejudicing the effects of the present invention.

Examples of the monomer other than ethylene, tetrafluoroethylene, and a fluorine-containing vinyl monomer include: hexafluoropropylene; perfluoroalkyl vinyl ether; chlorotrifluoroethylene; trifluoroethylene; hexafluoroisobutene; vinylidene fluoride [VdF]; vinyl fluoride; fluoroolefins represented by the following general formula:

$$CH_2=CX^1(CF_2)_nX^2,$$

where $X^1$ represents a hydrogen atom or a fluorine atom, $X^2$ represents a hydrogen atom, a fluorine atom, or a chlorine atom, n represents an integer of 1 to 10, and $X^1$ is a fluorine atom when $X^2$ is a fluorine atom; propylene; and alkyl vinyl ethers other than perfluoroalkyl vinyl ether. Examples of the fluoroolefins represented by the general formula $CH_2=CX^1(CF_2)_nX^2$ include $CH_2=CFCF_3$ and $CH_2=CFCF_2CF_2CF_2H$.

Preferably, the ethylene/tetrafluoroethylene copolymer of the present invention does not include a copper metal and a copper compound. The ethylene/tetrafluoroethylene copolymer not including a copper metal and a copper compound may be one substantially not including a copper metal and a copper compound.

The sentence "ethylene/tetrafluoroethylene copolymer does not include a copper metal and a copper compound." means that a copper metal and a copper compound do not substantially present in ethylene/tetrafluoroethylene copolymer aggregates. The term "ethylene/tetrafluoroethylene copolymer not including a copper atom" may refer to ethylene/tetrafluoroethylene copolymer aggregates not including a copper metal and a copper compound. The ethylene/tetrafluoroethylene copolymer aggregates substantially consist only of an ethylene/tetrafluoroethylene copolymer.

The composition of an ethylene/tetrafluoroethylene copolymer is analyzed, and in the case where the copolymer has a total amount of a copper metal and copper compound of 0.1% by mass or less, the copolymer is determined as an "ethylene/tetrafluoroethylene copolymer not including a copper metal and a copper compound".

If the ethylene/tetrafluoroethylene copolymer includes a copper metal or a copper compound, heat resistance thereof tends to be improved. However, when such a copolymer is thinly formed, the presence of the particles of the copper metal or the copper compound may deteriorate insulation of the copolymer, or the particles may drop from the formed body of the copolymer. Therefore, it is not desirable that the copolymer includes a copper metal or a copper compound.

Examples of the polymerization method for producing the ethylene/tetrafluoroethylene copolymer of the present invention include, but not particularly limited to, conventionally known polymerization methods such as solution polymerization, emulsion polymerization, suspension polymerization, and bulk polymerization. Industrially, suspension polymerization is preferable in which polymerization reaction is performed using a radical polymerization initiator in a mixed solvent of a fluorine-containing solvent and water.

Examples of the fluorine-containing solvent include hydrochlorofluoroalkanes such as $CH_3CClF_2$, $CH_3CCl_2F$, $CF_3CF_2CCl_2H$, and $CF_2ClCF_2CFHCl$; chlorofluoroalkanes such as $CF_2ClCFClCF_2CF_3$ and $CF_3CFClCFClCF_3$; and perfluoroalkanes such as perfluorocyclobutane, $CF_3CF_2CF_2CF_3$, $CF_3CF_2CF_2CF_3$, and $CF_3CF_2CF_2CF_2CF_2CF_3$. Among them, perfluoroalkanes are preferable. The fluorine-containing solvent is preferably used in an amount of 10 to 100% by mass to water, in terms of suspensibility and economy.

The polymerization initiator is preferably organic peroxides. Examples of the polymerization initiator include diisopropylperoxycarbonate, di-n-propyl peroxydicarbonate, bis (4-t-butylcyclohexyl)peroxydicarbonate, di-2-ethylhexylperoxydicarbonate, t-butylperoxyisopropylate, t-butylperoxyisobutyrate, t-butylperoxyacetate, t-butylperoxypivalate, t-butylperoxy-2-ethylhexanoate, t-butylperoxylaurate, and perfluorobutyrylperoxide. The amount of the polymerization initiator differs depending on the kind of compounds to be used, and is usually 0.01 to 10 parts by mass to 100 parts by mass of a polymer obtained.

In order to adjust the molecular weight of the ethylene/tetrafluoroethylene copolymer, a chain transfer agent may be used. Examples of the chain transfer agent to be used include: hydrocarbons such as isopentane, n-pentane, n-hexane, and cyclohexane; aromatics such as toluene and xylene; ketones such as acetone; ester acetates such as ethyl acetate and butyl acetate; mercaptans such as methyl mercaptan; alcohols such as methanol and ethanol; and halogenated hydrocarbons such as carbon tetrachloride, chloroform, methylene chloride, and methyl chloride. The amount of the chain transfer agent may be changed depending on a chain transfer constant of a compound to be used, and is usually 0.01 to 20% by mass to a polymerization solvent.

The polymerization temperature is preferably as low as possible for reducing the CH index, and may be 0° C. to 40° C., and more preferably 0° C. to 35° C. The polymerization pressure is appropriately determined depending on polymerization conditions other than the polymerization pressure, such as the solvent species employed, the amount, the vapor pressure, and the polymerization temperature. The polymerization pressure may be generally 0 to 9.8 MPaG. The polymerization time is appropriately determined depending on polymerization conditions other than the polymerization time, such as the polymerization temperature. The polymerization time may be generally 0.5 to 48 hours.

The ethylene/tetrafluoroethylene copolymer of the present invention is formed into a 220-μm-thick heat pressing sheet, and the sheet is allowed to stand at 200° C. or 225° C. for 336 hours. The obtained sheet may have an MIT folding endurance of 15000 or more times.

The MIT folding endurance can be measured by a standard folding endurance tester in accordance with ASTM D-2176.

The present invention also includes a forming material including the ethylene/tetrafluoroethylene copolymer of the present invention. The forming material of the present invention does not substantially include a copper metal or a copper compound. The forming material not substantially including a copper metal or a copper compound is such that even if the material contains a copper metal or a copper compound, the amount thereof is 0.1% by mass or less.

The forming material may be, for example, in the form of powder, pellet, or sheet, but may be in other forms.

The ethylene/tetrafluoroethylene copolymer is firstly formed into a sheet, and the sheet may be then ground into a powder.

The forming material may include, in addition to the ethylene/tetrafluoroethylene copolymer, additives such as flame retarders, stabilizers, ultraviolet absorbers, light stabilizers, antistatic agents, nucleating agents, lubricants, fillers, dispersants, metal deactivators, neutralizers, processing aids, mold lubricants, bubble forming agents, and colorants.

The present invention is also an electrical wire, comprising at least: a central conductor; and a covering layer formed at a periphery of the central conductor, the covering layer being made of a forming material including the ethylene/tetrafluoroethylene copolymer.

The covering layer of the electrical wire of the present invention is formed of a forming material including the ethylene/tetrafluoroethylene copolymer. Therefore, the electrical wire has good heat resistance and good crack resistance at high temperature.

Examples of the central conductor include copper, aluminium, and steel. The central conductor may be a tin-plated conducting wire or a silver-plated conducting wire. The electrical wire of the present invention may include other layers as long as the wire includes at least the central conductor and the covering layer.

The thickness of the covering layer may be appropriately determined depending on the performance needed for the electrical wire. The covering layer may, for example, have a thickness of 0.2 to 1.0 mm.

The electrical wire of the present invention can be produced by a conventionally known method. For example, the electrical wire can be produced by a method in which a cross head die is attached to an extruder, and the forming material is adhered around the central conductor in the extruder, cooled, and the obtained electrical wire is rolled up.

The ethylene/tetrafluoroethylene copolymer of the present invention may be used also for a wet coating or powder coating for paint or lining. The ethylene/tetrafluoroethylene copolymer of the present invention is excellent in heat resistance. Therefore, the copolymer is particularly suitable as a forming material used in rotational molding in which the copolymer is exposed to high temperature for a long time in air. When the ethylene/tetrafluoroethylene copolymer of the present invention is used as a powder coating or a powder for lining formed by rotational molding, bubble forming and coloring of the resulting material caused by thermal degradation can be suppressed. Further, the material generates no cracks when cooled and has good adhesiveness to a base material.

The present invention is also a fluororesin powder for rotational molding, comprising the ethylene/tetrafluoroethylene copolymer. The fluororesin powder for rotational molding has a MFR of 15 to 35 (g/10 minutes) and an average particle size of 10 to 500 μm. The average particle size can be, for example, measured using a laser diffraction particle size distribution analyzer.

The fluororesin powder for rotational molding preferably has an apparent density of 0.5 to 1.2 g/ml. The apparent density can be measured, for example, by the method in accordance with JIS K 6891.

The ethylene/tetrafluoroethylene copolymer of the present invention can be formed into various molded products, such as films, tubes, hoses, filaments, and bottles, by a known forming process, such as injection molding and extrusion. Such molded products have good heat resistance and good crack resistance at high temperature.

EXAMPLES

The present invention is explained by means of Examples, but is not limited thereto.

The values in Examples were measured by the following methods.

[Melting point]

Using a differential scanning calorimeter [DSC] (trade name: RDC220, product of Seiko Instruments Inc.), 3 mg of a sample was heated to 300° C. from room temperature at 10° C./min followed by cooling to room temperature at −10° C./min, and heated to determine a melting peak temperature from room temperature at 10° C./min again. The resulting melting peak temperature was defined as the melting point.

[MFR]

Using a melt indexer (product of Toyo Seiki Seisaku-sho, Ltd.), the MFR was determined, in accordance with ASTM D3159, as the weight (g/10 minutes) of the polymer flowing out through a nozzle with a 2-mm diameter and an 8-mm length during a 10-minute period of time under a load of 5 kg at 297° C.

[Monomer content]

A melted sample was analyzed by 300 MHz $^{19}$F—NMR spectroscopy to obtain a chart. The monomer content was calculated by the following formulae based on the chart.

(1) In the case where $CH_2=CH—C_nF_{2n+1}$ was used as a third monomer, each monomer content was determined by the following formulae:

Tetrafluoroethylene content=$\{3A+3B-2(n+1)C\}/\{3A+6B-2(n-2)C\}$

Ethylene content=$\{3B-2C\}/\{3A+6B-2(n-2)C\}$

Third monomer content=$4C/\{3A+6B-2(n-2)C\}$

In the formulae,

A represents an integral value within the range of −135 to −121 ppm

B represents an integral value within the range of −121 to −95 ppm

C represents an integral value within the range of −95 to −75 ppm (2) In the case where $CH_2=CF—C_nF_{2n}—H$ was used as a third monomer, each monomer content was determined by the following formulae:

Tetrafluoroethylene content=$\{A+2B-(n-1)D\}/\{A+2B-(n-3)D\}$

Ethylene content=$B/\{A+2B-(n-3)D\}$

Third monomer content=$2D/\{A+2B-(n-3)D\}$

In the formulae,

A represents an integral value of the range of −135 to −121 ppm,

B represents an integral value of the range of −121 to −95 ppm, and

D represents an integral value of the range of −145 to −135 ppm.

[Determination of CH index]

A sample was sufficiently swelled under high temperature using fluororesin oil as a solvent, and the sample was analyzed by 300 MHz $^{1}$H—NMR spectroscopy to give a chart. The CH index was calculated by the following formula based on the chart.

CH index=$E/F$×[ethylene content]

E represents an integral value of the range of a valley between peaks near 1.75 ppm to 1.96 ppm.

F represents an integral value within the range from 1.75 to 4.5 ppm.

[MIT folding test]

A film with a thickness of 0.22 mm was prepared by press-forming under conditions of 330° C. and 7.8 MPaG. The film was cut into a rectangle specimen with a width of 13 mm and a length of 90 mm. The specimen was attached to a MIT folding endurance tester (product of YASUDA SEIKI SEISAKUSHO, LTD.). The specimen was repeatedly folded back and forth under conditions (load of 1.25 kg, folding angle of 135° C., and speed of 175 times/min) in accordance with ASTM D-2176. The folding times were counted until the specimen broke.

[Heat aging test]

A film with a thickness of 0.22 mm was prepared by press forming under conditions of 330° C. and 7.8 MPaG. The film was placed in a circulating hot air electric furnace that was heated to 200° C. or 225° C., and allowed to stand for 336 hours (two weeks). The film was then taken out from the furnace and cooled. Then, the film was subjected to the MIT folding test. Thus, the results of the MIT folding test after heat aging were obtained.

Example 1

An autoclave of 4-L capacity was charged with 1.28 L of distilled water, atmosphere inside the autoclave was sufficiently replaced with nitrogen gas, and then 880 g of octafluorocyclobutane was added thereto. Then, the temperature in the system was maintained at 35° C. and the rate of stirring was maintained at 580 rpm. Subsequently, 231 g of tetrafluoroethylene, 7.5 g of ethylene, 2.38 g of (perfluorobutyl)ethylene, and 2.6 g of cyclohexane were added thereto, and thereafter, 7.1 g of di-n-propylperoxydicarbonate was added. Then, a polymerization reaction was initiated. The pressure in the system may be reduced with the progress of the polymerization. Therefore, mixed gas of tetrafluoroethylene/ethylene=57.0/43.0 mol % was continuously added to thereby maintain the pressure in the system at 1.2 MPaG. The amount of 3.9 g of perfluorobutylethylene in total was continuously added, and the mixture was stirred for 2.6 hours. Then, the pressure in the system was released to atmospheric pressure, and the reaction product was rinsed with water and dried to give 140 g of a fluororesin powder. The rate of the polymerization was almost uniform at 53.8 g/hr throughout the whole reaction.

Example 2

A polymerization reaction was performed in the same way as in Example 1 for 3.5 hours except that (perfluorobutyl)ethylene to be initially added was 3.58 g, the amount of a composition of mixed gas to be added during the reaction was tetrafluoroethylene/ethylene=56.5/43.5 mol %, and the amount of (perfluorobutyl)ethylene to be additionally added was 6.3 g in total. Thereby, 120 g of a fluororesin powder was prepared. The rate of the polymerization was almost uniform at 34.3 g/hr throughout the whole reaction.

Example 3

A polymerization reaction was performed in the same way as in Example 1 for 3 hours except that 3.00 g of (perfluorohexyl)ethylene was added instead of 2.38 g of (perfluorobutyl)ethylene to be initially added, and 5.6 g of (perfluorohexyl)ethylene was added instead of (perfluorobutyl)ethylene to be additionally added. Thereby, 123 g of a fluororesin powder was prepared. The rate of the polymerization was almost uniform at 41.0 g/hr throughout the whole reaction.

Example 4

An autoclave of 1000-L capacity was charged with 416 L of distilled water, atmosphere inside the autoclave was sufficiently replaced with nitrogen gas, and then 287 kg of octafluorocyclobutane was added thereto. Then, the temperature in the system was maintained at 35° C. and the rate of stirring was maintained at 130 rpm. Then, 76.1 kg of tetrafluoroethylene, 2.4 kg of ethylene, 1.47 kg of (perfluorohexyl)ethylene, and 0.63 kg of cyclohexane were added thereto, and thereafter, 3.1 kg of di-n-propylperoxydicarbonate was added. Then, a polymerization reaction was initiated. The pressure in the system may be reduced with the progress of the polymerization. Therefore, mixed gas of tetrafluoroethylene/ethylene=57.0/43.0 mol % was continuously added to thereby maintain the pressure in the system at 1.20 MPaG. The amount of 18.2 kg of (perfluorohexyl)ethylene in total was continuously added, and the polymerization was continued. After 2.5 hours from the start of the polymerization, 330 g of cyclohexane was added for MFR adjustment. After 17 hours from the start of the polymerization, the pressure in the system was released to atmospheric pressure, and the reaction product was rinsed with water and dried to give 250 kg of a fluororesin powder. The rate of the polymerization in the first 2.5 hours of the polymerization was almost uniform at 17.2 kg/hr, and from this point, the rate of the polymerization was 16.0 kg/hr through the completion of the polymerization.

Example 5

A polymerization reaction was performed in the same way as in Example 4 for 20.5 hours except that 330 g of cyclohexane was added after 2.5 hours from the start of the polymerization for MFR adjustment, 1.2 kg of cyclohexane was further added after 9.2 hours from the start of the polymerization, and the additional amount of (perfluorohexyl)ethylene was 19.1 kg in total. Thereby, 270 kg of a fluororesin powder was prepared. The rate of the polymerization in the first 2.5 hours of the polymerization was almost uniform at 17.2 kg/hr, and from this point, the rate of the polymerization was 17.3 kg/hr through 9.2 hours after the start of the polymerization, and from this point, the rate of the polymerization was 11.3 kg/hr through the completion of the polymerization.

Example 6

A polymerization reaction was performed in the same way as in Example 1 for 3 hours except that 3.46 g of (perfluorooctyl)ethylene was added instead of 2.38 g of (perfluorobutyl)ethylene to be initially added, and 7.5 g of (perfluorooctyl)ethylene was added instead of (perfluorobutyl)ethylene to be additionally added. Thereby, 125 g of a fluororesin powder was prepared. The rate of the polymerization was almost uniform at 41.7 g/hr throughout the whole reaction.

Example 7

A polymerization reaction was performed in the same way as in Example 6 for 3 hours except that the amount of (perfluorooctyl)ethylene to be initially added was 5.19 g and the amount of (perfluorooctyl)ethylene to be additionally added was 10.7 g. Thereby, 125 g of a fluororesin powder was prepared. The rate of the polymerization was almost uniform at 41.0 g/hr throughout the whole reaction.

Comparative Example 1

An autoclave of 1000-L capacity was charged with 312 L of distilled water, atmosphere inside the autoclave was sufficiently replaced with nitrogen gas, and then 212 kg of octafluorocyclobutane was added thereto. Then, the temperature in the system was maintained at 35° C. and the rate of stirring was maintained at 130 rpm. Then, mixed gas of tetrafluoroethylene/ethylene=79/21 mol % was added to increase the pressure in the system to 1.28 MPaG. Further, 1.5 kg of perfluoro(1,1,5-trihydro-1-pentene) and 1.7 kg of cyclohexane were added thereto, and thereafter, 1.1 kg of di-n-propylperoxydicarbonate was added. Then, a polymerization reaction was initiated. The pressure in the system may be reduced with the progress of the polymerization. Therefore, mixed gas of tetrafluoroethylene/ethylene=56.0/44.0 mol % was continuously added to thereby maintain the pressure in the system at 1.28 MPaG. Further, 8.5 kg of perfluoro (1,1,5-trihydro-1-pentene) in total was continuously added, and the polymeriztion was continued. After 25 hours from the start of the polymerization, the pressure in the system was released to atmospheric pressure, and the reaction product was rinsed with water and dried to give 200 kg of a fluororesin powder.

Comparative Example 2

An autoclave of 1000-L capacity was charged with 312 L of distilled water, atmosphere inside the autoclave was sufficiently replaced with nitrogen gas, and then 214 kg of octafluorocyclobutane was added thereto. Then, the temperature in the system was maintained at 17° C. and the rate of stirring was maintained at 130 rpm. Then, ethylene was added to increase the pressure in the system by 0.07 MPa, and tetrafluoroethylene was subsequently added to increase the pressure to 0.87 MPaG. Further, 0.7 kg of perfluoro(1,1,5-trihydro-1-pentene) and 0.2 kg of cyclohexane were added, and the system was heated up to 35° C. The amount of 1.6 kg of di-n-propyl peroxydicarbonate was added thereto. Then, a polymerization reaction was initiated. The pressure in the system may be reduced with the progress of the polymerization. Therefore, mixed gas of tetrafluoroethylene/ethylene=65.0/35.0 mol % was continuously added to thereby maintain the pressure in the system at 1.28 MPaG. The amount of 12.6 kg of perfluoro(1,1,5-trihydro-1-pentene) in total was continuously added, and the polymerization was continued. After 45 hours from the start of the polymerization, the pressure in the system was released to atmospheric pressure, and the reaction product was rinsed with water and dried to give 200 kg of a fluororesin powder.

Comparative Example 3

An autoclave of 10-L capacity was deaerated and charged with 4.9 kg of trichloromonofluoromethane, 5.1 kg of 1,1,1-trichlorotrifluoroethane, 1.2 kg of tetrafluoroethylene, 82 g of ethylene, and 26 g of (perfluorobutyl)ethylene. The temperature in the system was maintained at 65° C., and 2.4 g of t-butylperoxyisobutyrate was added thereto. Then, a reaction was initiated. The pressure in the system may be reduced with the progress of the polymerization. Therefore, mixed gas of tetrafluoroethylene/ethylene=53.4/46.6 mol % was continuously added to thereby maintain the pressure in the system at 1.47 MPaG. Subsequently, the mixture was stirred for 5 hours while 11.7 g of (perfluorobutyl)ethylene in total was continuously added thereto. The resulting mixture was cooled and the polymerization was stopped. The monomer was purged from the mixture to give polymer dispersion. The dispersion was filtered to give a reactant. The reactant was rinsed with water, and dried to give 460 g of a fluororesin powder.

Comparative Example 4

A polymerization reaction was performed in the same way as in Comparative Example 3 except that the amount of (perfluorobutyl)ethylene to be initially added was 47 g, the amount of (perfluorobutyl)ethylene to be additionally added was 36.7 g, and the polymerization time was 11 hours. Thereby, 690 g of a fluororesin powder was prepared.

Comparative Example 5

A polymerization reaction was performed in the same way as in Comparative Example 4 except that no trichloromonofluoromethane was initially added, 10 kg of trichloromonofluoroethane was initially added, and 60 g of methanol was added. Thereby, 690 g of a fluororesin powder was prepared. Table 1 shows the evaluation results of
Examples 1 to 7 and Comparative Examples 1 to 5.

200 kg of a fluororesin powder having MFR of 28.g/10 minutes. The fluororesin powder was made into a sheet using a roller compactor, and the sheet was crushed into granular materials, each having a size of about 2 mm. The materials were ground and classified using an atomizer grinding equip-

TABLE 1

| | Fluorine-containing vinyl monomer | | | | | | | MIT folding test [folding times] | |
| --- | --- | --- | --- | --- | --- | --- | --- | --- | --- |
| | Carbon atoms at side chain | Content [mol %] | Et/TFE [mol %] | MFR [g/10 min.] | Melting point [° C.] | CH index [—] | Before annealing | After annealing 200° C. for two weeks | After annealing 225° C. for two weeks |
| Example 1 | 4 | 0.8 | 43.1/56.9 | 7.4 | 260 | 1.16 | 50800 | 40600 | 12500 |
| Example 2 | 4 | 1.2 | 43.6/56.4 | 9.0 | 258 | 1.38 | 62600 | 52001 | 26700 |
| Example 3 | 6 | 0.8 | 42.8/57.2 | 10.3 | 259 | 1.02 | 43300 | 42578 | 17800 |
| Example 4 | 6 | 1.4 | 42.8/57.2 | 4.7 | 252 | 1.14 | 79000 | 76084 | 49200 |
| Example 5 | 6 | 1.3 | 43.0/57.0 | 14.5 | 253 | 0.98 | 24000 | 16922 | 17300 |
| Example 6 | 8 | 0.9 | 43.1/56.9 | 8.0 | 259 | 1.28 | 57600 | 47682 | 33600 |
| Example 7 | 8 | 1.3 | 43.4/56.6 | 11.1 | 257 | 1.16 | 43600 | 59030 | 15800 |
| Comparative Example 1 | 3 | 1.5 | 44.2/55.8 | 14.5 | 264 | 1.48 | 17400 | 6422 | 9700 |
| Comparative Example 2 | 3 | 2.5 | 34.9/65.1 | 30.0 | 219 | 0.14 | 82000 | 69291 | Melt deformed. Unable to measure |
| Comparative Example 3 | 4 | 0.7 | 43.8/56.2 | 11.4 | 263 | 1.96 | 19500 | 1732 | 800 |
| Comparative Example 4 | 4 | 1.2 | 43.8/56.2 | 11.2 | 255 | 2.12 | 39500 | 6727 | 3300 |
| Comparative Example 5 | 4 | 1.3 | 43.8/56.2 | 31.5 | 255 | 1.81 | 15000 | 2613 | 1700 |

Example 8

A polymerization reaction was performed in the same way as in Example 4 except that the amount of cyclohexane to be initially added was 0.83 kg, 330 g of cyclohexane was added after 3.5 hours from the start of the polymerization for MFR adjustment, 1.5 kg of cyclohexane was further added after 11.8 hours from the start of the polymerization, 1.0 kg of cyclohexane was additionally added after 19 hours from the start of the polymerization, and the additional amount of (perfluorohexyl)ethylene was 19.1 kg in total, and was completed in 22 hours. The solvent and water were removed, and then 400 kg of distilled water and 9 kg of 28% aqueous ammonia were added. The resulting solution was allowed to react in an autoclave at 80° C. for 5 hours with stirring at the stirring speed of 30 rpm. The resulting solution was cooled, rinsed with water, and dried to give 270 kg of a fluororesin powder having MFR of 29 g/10 minutes. The fluororesin powder was made into a sheet using a roller compactor, and the sheet was crushed into granular materials, each having a size of about 2 mm. The materials were ground and classified using an atomizer grinding equipment. Thereby, a copolymer powder having an average particle size of 220 μm and an apparent density of 0.85 g/ml was prepared.

Comparative Example 6

A polymerization reaction was performed in the same way as in Comparative Example 2 except that the amount of cyclohexane to be initially added was 0.18 kg, and completed in 45 hours. The solvent and water were removed, 400 kg of distilled water and 9 kg of 28% aqueous ammonia were added, the resulting solution was allowed to react in an autoclave at 80° C. for 5 hours with stirring at the stirring speed of 30 rpm. The reactant was cooled, rinsed with water, and dried to give ment. Thereby, a copolymer powder having an average particle size of 220 μm and an apparent density of 0.85 g/ml was prepared.

Comparative Example 7

A polymerization reaction was performed in the same way as in Comparative Example 5 except that the amount of methanol to be initially added was 51 g. Thereby, 690 g of a fluororesin powder having MFR of 28 g/10 minutes was prepared. The fluororesin powder was made into a sheet using a roller compactor, and the sheet was crushed into granular materials, each having a size of about 2 mm. The materials were ground and classified using an atomizer grinding equipment. Thereby, a copolymer powder having an average particle size of 200 μm and an apparent density of 0.85 g/ml was prepared.
[Heat resistant test]

A plate of SUS304 having a size of 100 mm long by 50 mm wide by 0.8 mm thick was prepared. The surface of the plate was blasted to prepare a test substrate having center line average roughness Ra of 1.2 to 1.4 μm and a maximum height Rz of 8.0 to 8.8 μm. The copolymer powder prepared was raised on the test substrate into a powder bed having a size of 100 mm long by 50 mm wide by 1 mm thick using a spacer. Thereby, test pieces were prepared. The test pieces were burned at 270° C., 280° C., 290° C., and 300° C., respectively, for 2 hours in an open system. Thereby, a coating was formed. The degree of coloring and bubble formation of the coating were evaluated based on the following criteria. The coating was provided with 1 cm-wide cuts and the terminal portion was peeled. Then, the coating test pieces were subjected to a 90 degree peel strength test at a tensile speed of 50 mm/min using a Tensilon universal tester. Thereby, the adhesiveness of the coating was evaluated. Table 2 shows the evaluation results.

1. Coloring
⊚ No coloring
O Slightly colored
Δ Colored in yellow ocher
x Colored in brown
2. Bubble formation
⊚ No bubbles
O 1 to 3 small bubbles
Δ Many small bubbles
x Significant bubbling

TABLE 2

| | Fluorine-containing vinyl monomer | | | | | Burned at 270° C. | | |
| | Carbon atoms at side chain | Content [mol %] | Et/TFE [mol %] | Melting point [° C.] | CH Index [—] | Coloring | Bubble formation | Adhesiveness |
|---|---|---|---|---|---|---|---|---|
| Example 8 | 6 | 1.4 | 42.8/57.2 | 252 | 1.16 | ⊚ | ⊚ | 4.7 |
| Comparative Example 6 | 3 | 2.5 | 35.0/65.0 | 219 | 0.13 | ⊚ | ⊚ | 2.7 |
| Comparative Example 7 | 4 | 1.3 | 43.8/56.2 | 255 | 1.80 | ⊚ | ⊚ | 4.1 |

| | Burned at 280° C. | | | Burned at 290° C. | | | Burned at 300° C. | | |
| | Coloring | Bubble formation | Adhesiveness | Coloring | Bubble formation | Adhesiveness | Coloring | Bubble formation | Adhesiveness |
|---|---|---|---|---|---|---|---|---|---|
| Example 8 | ⊚ | ⊚ | 3.7 | ⊚ | ⊚ | 4.6 | O | O | 7.2 |
| Comparative Example 6 | ⊚ | ⊚ | 2.6 | ⊚ | ⊚ | 2.7 | Δ | O | 2.9 |
| Comparative Example 7 | ⊚ | O | 4.9 | ⊚ | X | 2.6 | X | O | 3.9 |

Industrial Applicability

The ethylene/tetrafluoroethylene copolymer of the present invention is suitable for a covering material for an electrical wire and a powder coating for rotational molding, and may be processed into various molded products.

The invention claimed is:

1. An ethylene/tetrafluoroethylene copolymer, comprising:
copolymerization units derived from ethylene;
tetrafluoroethylene; and
a fluorine-containing vinyl monomer represented by general formula:

CH$_2$=CH—Rf in the formula, Rf representing a perfluoroalkyl group containing four or more carbon atoms,
a fluorine-containing vinyl monomer content being 0.8 to 2.5 mol % to a total amount of all monomers,
an ethylene/tetrafluoroethylene molar ratio being 33.0/67.0 to 44.0/56.0,
a CH index being 1.40 or less,
a melting point being 230 ° C. or higher, and
a melt flow rate being 40 (g/10 minutes) or less.

2. The ethylene/tetrafluoroethylene copolymer according to claim 1,
wherein the fluorine-containing vinyl monomer content is 1.2 to 1.8 mol %.

3. The ethylene/tetrafluoroethylene copolymer according to claim 1,
wherein the ethylene/tetrafluoroethylene molar ratio is 34.5/65.5 to 44.0/56.0.

4. The ethylene/tetrafluoroethylene copolymer according to claim 1,
wherein the melting point is 240 ° C. or higher.

5. The ethylene/tetrafluoroethylene copolymer according to claim 1,
wherein the copolymer does not include a copper metal or does not include a copper compound.

6. An electrical wire, comprising at least:
a central conductor; and
a covering layer formed at a periphery of the central conductor,
the covering layer being made of a forming material including the ethylene/tetrafluoroethylene copolymer according to claim 1.

7. A fluororesin powder for rotational molding, comprising the ethylene/tetrafluoroethylene copolymer according to claim 1,
wherein the fluororesin powder for rotational molding has a MFR of 15 to 35 (g/10 minutes) and an average particle size of 10 to 500 μm.

8. The ethylene/tetrafluoroethylene copolymer according to claim 1, having a CH index of 0.80 or greater and 1.40 or less.

* * * * *